United States Patent

Kobayashi et al.

[11] Patent Number: 4,841,006
[45] Date of Patent: Jun. 20, 1989

[54] RELEASE COATING-FORMING COMPOSITION

[75] Inventors: Keiji Kobayashi; Takashi Urabe, both of Gumna, Japan

[73] Assignee: Toshiba Silicone Co., Ltd., Tokyo, Japan

[21] Appl. No.: 228,080

[22] Filed: Aug. 4, 1988

[30] Foreign Application Priority Data

Aug. 4, 1987 [JP] Japan .................. 62-194771

[51] Int. Cl.$^4$ .............................. C08G 77/06
[52] U.S. Cl. ....................... 528/15; 528/31; 528/32; 525/478; 524/861; 524/445
[58] Field of Search ................. 528/15, 31, 32; 525/478

[56] References Cited

U.S. PATENT DOCUMENTS 4,361,679  11/1982  Yajima et al. ............... 528/5
4,500,584  2/1985  Modic ..................... 528/32

Primary Examiner—Melvyn I. Marquis
Attorney, Agent, or Firm—Sughrue, Mion, Zinn, Macpeak, and Seas

[57] ABSTRACT

A composition for forming a release coating comprises:
(A) 100 parts by weight of a polyorganoborosiloxane having an average composition represented by formula I:

$$R_a SiO_{(4-a)/2} \cdot (BO_{1.5})_b \qquad (I)$$

wherein R is a substituted or unsubstituted monovalent hydrocarbon group bonded to a silicon atom, a is a number between 1.8 and 2.2, and b is a positive number, and containing at least 30 ppm by weight of boron atoms in the form of $\equiv$Si—O—B$=$ linkages, each molecule thereof containing at least two alkenyl groups bonded to a silicon atom;

(B) a polyorganohydrogensiloxane containing in each molecule at least three hydrogen atoms bonded to silicon atoms in an amount of 0.5 to 10 hydrogen atoms for each of the alkenyl groups in component (A); and (C) a catalytic amount of a curing catalyst selected from the group consisting of platinum and platinum compounds.

3 Claims, No Drawings

RELEASE COATING-FORMING COMPOSITION

FIELD OF THE INVENTION

This invention relates to a release coating-forming composition. More particularly, it relates to a silicone-based composition which forms a release coating having a small peel force to an adhesive material at a low speed peeling and also considerably small peel force event at a high speed peeling.

BACKGROUND OF THE INVENTION

It is known that various compositions comprising a polyorganosiloxane as a main component are cured on a surface of a base material such as paper, a synthetic film or a fibrous substrate to form a coating thereon, thereby imparting release properties to a base material against an adhesive substance. Those conventional polyorganosiloxane compositions include compositions which form a coating having a low releasability, and compositions which form a coating having a medium or high releasability. Examples of the former include compositions which are cured by a condensation reaction, as disclosed in, for examples, JP-A-Nos. 47-34447 and 48-22703 (The term "JP-A" as used herein means an "unexamined published Japanese patent application"), and compositions which are cured by an addition reaction as disclosed in, for example, JP-B-No. 52-40918 (The term "JP-B" as used herein means an "examined Japanese patent publication"). Examples of the latter include compositions which contain a copolymer comprising $(CH_3)_3SiO_{\frac{1}{2}}$ and $SiO_2$ units and a silica fine powder as disclosed in, for example, JP-A-No. 52-86985, compositions which are prepared by using vinyl group-containing polysiloxanes having $SiO_2$ units as disclosed in, for example, JP-A-Nos. 52-24933 and 55-110155, and compositions which are obtained by equilibrating linear vinyl group-containing polysiloxanes and copolymers comprising $(CH_3)_3SiO_{\frac{1}{2}}$, $(CH_3)_2SiO$, $(CH_2)SiO_{1.5}$ and $SiO_2$ units as disclosed in, for example, JP-A-No. 56-53150.

Compositions which can form a coating which reduces a peel force at a high speed peeling are also known. Examples of such compositions include compositions obtained by blending polyorganosiloxanes containing methylvinylsiloxane units and having hydroxyl or vinyl groups at the ends of the molecular chain as disclosed in, for example, JP-A-No. 50-25644, and compositions obtained by adding polyorganosiloxanes containing aryl groups to an addition reaction-type composition as disclosed in, for example, JP-A-No. 60-133051. The coatings formed from those compositions, however, have the problems that a peel force becomes large at a low speed peeling, or a subsequent adhesion rate is decreased.

SUMMARY OF THE INVENTION

Accordingly, an object of this invention is to overcome the disadvantages of the prior art as described above and provide a composition which can form a release coating requiring only a small peel force at a low speed peeling of 0.3 to 30 m/min. and a considerably small peel force even at a high speed peeling of 60 to 200 m/min., and also having a good subsequent adhesion rate.

This object can be attained by using an addition cure-type composition prepared by using polyorganosiloxanes having a specific structure of containing $\equiv Si-O-B\equiv$ linkages in the molecule thereof.

The composition of this invention comprises:

(A) 100 parts by weight of a polyorganoborosiloxane having an average composition represented by the following formula:

$$R_aSiO_{(4-a)/2}\cdot(BO_{1.5})_b \qquad (I)$$

wherein R is a substituted or unsubstituted monovalent hydrocarbon group bonded to a silicon atom, a is a number between 1.8 and 2.2, and b is a positive number, and containing at least 30 ppm by weight, based on the weight of the formula (I), of a boron atom in the form of a $\equiv Si\text{-}O\text{-}B\equiv$ linkage, each molecule thereof containing at least two alkenyl groups bonded to a silicon atom;

(B) a polyorganohydrogensiloxane containing in each molecule at least three hydrogen atoms bonded to silicon atoms in an amount of 0.5 to 10 hydrogen atoms for each of the alkenyl groups in component (A) above; and (C) a catalytic amount of a curing catalyst selected from the group consisting of platinum and platinum compounds.

DETAILED DESCRIPTION OF THE INVENTION

The polyorganoborosiloxane of component (A) is the most characteristic component in the composition of this invention, which maintains a small peel force at a low speed peeling of the release coating, but reduces the peel force thereof at a high speed peeling, and also maintains a good subsequent adhesion rate:

The component (A) is required to contain at least 30, and preferably at least 100, ppm by weight, based on the weight of the formula I, of a boron atom in the form of a $\equiv Si-O-B\equiv$ linkage. The larger amount of $\equiv Si-O-B\equiv$ linkages, the lower peel force of a release film at a high speed peeling. This peel force, however, becomes almost constant when the amount of the linkages has reached 600 ppm by weight or more. The linkages may exist at the ends of the molecular chain or in the middle portion thereof.

In formula (I), R is a substituted or unsubstituted monovalent hydrocarbon group. Each molecule is required to contain at least two alkenyl groups. Examples of the alkenyl groups include vinyl, allyl and butenyl groups. The alkenyl groups may exist at the ends of the molecular chain, in the middle portion thereof, or both. If they are contained in a relatively small amount, however, it is preferred for the alkenyl groups to exist at least at the ends of the molecular chanin, so that a coating after curing has a high mechanical strength.

Examples of the organic groups bonded to silicon atoms, other than the alkenyl groups, are an alkyl group such as methyl, ethyl, propyl, butyl, hexyl and dodecyl, an aryl group such as phenyl., an aralkyl group such as β-phenylethyl and β-phenylpropyl, and a monovalent substituted hydrocarbon group such as chloromethyl and 3,3,3-trifluoropropyl. Of those, the methyl group is most preferred from the standpoint of the easy synthesis and maintaining good physical properties after curing.

In formula (I), a is a number between 1.8 and 2.2, both inclusive. If the number is less than 1.8, a peel force of the release coating at a low speed peeling becomes large, and if it is over 2.2, a mechanical strength of the release coating is decreased.

The molecule of the component (A) may be linear or branched, or a mixture thereof. It is, however, preferred to not contain many branched molecules, in order to reduce the peel force of the release coating at a low speed peeling.

The component (A) preferably has a viscosity of at least 100 cP at 25° C. If its viscosity is lower than 100 cP, its impregnation into a base material tends to increase and it results in the failure to form a coating having high release properties, if the base material is glassine or kraft paper.

The polyorganoborosiloxane can be easily obtained by, for example, polymerizing a linear or cyclic organosiloxane with an acid catalyst in the presence of boric acid, boric anhydride, etc. Examples of the acid catalyst are activated clay, sulfuric acid, phosphoric acid and iron chloride, which may be employed either alone or together. The use of activated clay is, however, preferred, as such can be separated from the polymerized product without neutralization step after polymerization, and does not color the polymerized product.

The component (B), polyorganohydrogensiloxane, is used to conduct a crosslinking reaction with the component (A), polyorganoborosiloxane, to form a cured coating. It is required for the component (B) to contain at least three hydrogen atoms bonded to silicon atoms. The organic groups bonded to the silicon atoms other than those bonded to the hydrogen atoms can be selected from the same groups as in the component (A). Of those, the methyl group is preferred from the standpoint of the ease of synthesis and also of obtaining a coating having good physical properties.

The molecules of the polyorganohydrogensiloxane may be either linear, branched or cyclic, or a mixture thereof. The mixture of the following a to c is, however, preferred in the point of imparting good physical properties to the composition after curing.

a. Branched polyorganohydrogensiloxane comprising $(CH_3)_2HSiO_{\frac{1}{2}}$ and $SiO_2$ units and containing 0.3 to 1.2% by weight of hydrogen atoms bonded to silicon atoms;

b. Linear polyorganohydrogensiloxane represented by the following formula:

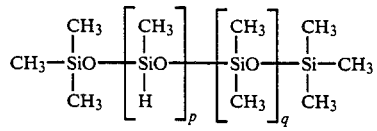

wherein p is an integer of 3 to 100 and q is an integer of 0 to 100, and containing 0.5 to 1.6% by weight of hydrogen atoms bonded to silicon atoms; and c. Linear polyorganohydrogensiloxane represented by the following formula:

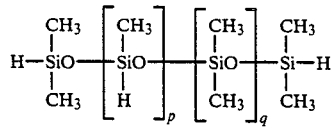

wherein p is an integer of 1 to 100 and q is an integer of 0 to 100, and containing 0.5 to 1.6% by weight of hydrogen atoms bonded to silicon atoms.

The component (B) is used in such an amount that hydrogen atoms bonded to silicon atoms are 0.5 to 10, and preferably, 0.5 to 3.0, per alkenyl group in the component (A). If the number of the hydrogen atoms is less than 0.5, curing of the composition does not proceed sufficiently and as a result, hardness of the coating after curing is insufficient. On the other hand, if it exceeds 10, physical properties of the coating after curing are undesirably decreased.

Platinum or platinum compound catalyst of the component (C) used in the present invention accelerates an addition reaction between the alkenyl groups in the component (A) and the hydrosilyl groups in the component (B). Examples of the component (C) are platinum, chloroplatinic acid, a platinum-olefin complex, a platinum-alcohol complex, a platinum-phosphorus complex, a platinum coordination compound and the like. The catalyst is preferably used in an amount of 1 to 300 ppm, calculated as platinum atoms, based on the component (A). If the amount of platinum atoms is less than 1 ppm, the curing of a composition is delayed, and if the amount exceeds 300 ppm, improvement on the curing rate, etc. cannot be expected, and this is not preferred economically.

The composition of this invention may further contain various kinds of other polyorganosiloxanes, an inorganic filler, an ultraviolet curing agent, a reaction rearder, a pigment, etc., if desired and necessary, in the amount such that they do not adversely affect the properties of the composition.

The composition of this invention can be applied directly to a base material if its viscosity is sufficiently low, but the composition is generally used by dissolving it in a solvent from the standpoint of workability at coating or treatment. Examples of the solvent which can be used are aromatic hydrocarbons such as benzene, toluene and xylene; aliphatic hydrocarbons such as heptane and hexane; halogenated hydrocarbons such as perchloroethylene; ethyl acetate; and methyl ethyl ketone.

The composition of this invention is usually used as a. two-part system. In other words, the component (C) is mixed with a mixture of the components (A) and (B) containing the necessary additives, solvent, etc., if any, when the composition is used.

The release coating obtained by curing the composition of the present invention has a small peel force to an adhesive substance at not only a low speed peeling, but also a high speed peeling, and does not deteriorate the subsequent adhesion rate.

A release paper having the release coating formed thereon enables the application of an adhesive, the production of labels, etc. at a high speed, and a remarkable improvement effect on productivity can be obtained.

The invention will now be described in further detail by reference to examples and comparative examples. In the following examples and comparative examples, all parts are by weight. The following symbols are used to simplify the representation of molecular structures:

M: $(CH_3)_3SiO_{0.5}$
$M^v$: $(CH_3)_2(CH_2=CH)SiO_{0.5}$
D: $(CH_3)_2SiO$
$D^v$: $CH_3(CH_2=CH)SiO$

The following methods were employed to evaluate each release coating.

Curing of the Composition

The solution as prepared in each example or comparative example was applied onto polyethylene laminated paper having a unit weight of 75 g/m² in a coating thickness of 0.7 g/m², and the coating was cured by heating at 140° C. for 30 seconds. The cured sample was aged by allowing it to stand at a temperature of 25° C. and a relative humidity of 50% for one day. The sample thus obtained was subjected to the following tests.

Determination of the Peel Strength

A solvent-type acrylic adhesive (ORIBAIN BPS8170, a product of Toyo Ink Co,, Ltd.) or an emulsion-type adhesive (ORIBAIN BPS3110H , a product of Toyo Ink Co., Ltd.) was applied onto the surface of the cured coating after aging in a wet thickness of 88 μm. The coating was dried by heating at 100° C. for 2 minutes.

Facing paper was bonded to the coating and the resulting laminate was cut into strips having a width of 2.5 cm. The strips were aged at a temperature of 25° C. and a relative humidity of 50% under a load of 20 g/cm$^2$ for one day. A peel strength of the strips thus aged was measured with a tensile testing machine by pulling the paper in a 180° direction at rates of 0.3, 60 and 200 m/min.

Determination of Subsequent Adhesion Rate

An adhesive tape having a width of 2.5 cm (NITTO 31B, a product of Nitto Electric Industrial Co,, Ltd.) was adhered to the surface of the coating cured and aged, and a load of 20 g/cm$^2$ was applied thereto. After allowing to stand it at a temperature of 70° C. for 20 hours, the tape was peeled from the coating and was adhered to a stainless steel sheet (JIS C2107). The tape was pressed to the stainless steel sheet by a 2 kg roller and was aged at a temperature of 25° C. for 3 hours. The tape was pulled in a 180° C. direction to measure the peel strength (f) of the tape. As a blank sample, an adhesive tape (NITTO 31B) was adhered to a polytetrafluoroethylene film and its peel strength (of) was determined in the same manner as above.

The subsequent adhesion rate (%) was calculated by the following formula:

Subsequent Adhesion Rate (%) = $f/f_o \times 100$

SYNTHESIS EXAMPLE 1

A gum polymerizer equipped with a reflux condenser was charged with 98.2 parts of a cyclic siloxane of the formula $D_4$, 1.69 parts of a cyclic siloxane of the formula $D_4^v$, 0.09 part of a linear siloxane of the formula $M^vD_2M^v$ and 0.059 part of boric acid, and further with 1.0 part of activated clay as a polymerization catalyst. Polymerization was conducted at a temperature of 140° C. for 5 hours under a nitrogen atmosphere while stirring. A polymer thus obtained was cooled and dissolved in toluene, and the resulting solution was filtered to remove the activated clay used as a polymerization catalyst. The filtrate was stripped at a pressure of 15 mm Hg and a temperature of 140° C. for eight hours to remove the toluene and low-boiling siloxane, and a colorless and transparent gum G-1 was obtained. Gum G-1 had the average composition represented by the formula:

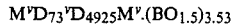

$M^vD_{73}^vD_{4925}M^v.(BO_{1.5})_{3.53}$ and contained 103 ppm by weight of boron atoms in the form of ≡Si—O—B= linkage in the polymer.

SYNTHESIS EXAMPLE 2

Colorless and transparent gums G-2 to G-6 were synthesized by repeating the procedure of Synthesis Example 1, except that siloxanes, boron compounds and activated clay as shown in Table 1 below were used in the proportions shown in Table 1. All of these polymers contained boron atoms in the form of ≡Si—O—B= linkages. The boron content of each polymer and the formula representing its average composition are shown in Table 1.

SYNTHESIS EXAMPLE 3

Colorless and transparent gum G-7 was synthesized by repeating the procedure of Synthesis Example 1, except that boric acid was not added. Its average composition was represented by the formula:

$M^vD_{73}^vD_{49\ 25}M^v$.

PREPARATION EXAMPLE 1

100 Parts of gum G-7 obtained in Synthesis Example 3 and 0.1 part of boric anhydride were kneaded under heating in a dough mixer at a temperature of 140° C. for 5 hours to obtain while gum G-8 containing boric anhydride finely dispersed therein.

EXAMPLES AND COMPARATIVE EXAMPLES

Gums G-1 to G-8 were each dissolved in toluene in the proportions as shown in Table 2 below. Polymethylhydrogensiloxane (H-1) having a main chain comprising methylhydrogensiloxy units with both ends blocked by trimethylsiloxy groups and having a viscosity of 20 cP at 25° C., and an isopropyl alcohol solution of chloroplatinic acid having a platinum concentration of 6,000 ppm (C-1) were admixed with the solution of each gum in the proportions as shown in Table 2 to prepare a coating solution containing each gum.

In Comparative Example 3, polyorganosiloxane (P-1) having a main chain comprising 10 mol % of diphenylsiloxy units and 90 mol % of dimethylsiloxy units with both ends blocked by trimethylsilyl groups and having a viscosity of 1,000 cP at 25° C. was also added as shown in Table 2 below to prepare a treating solution, for the purpose of decreasing a peel strength at a high speed peeling.

Each of the treating solution prepared above was used to evaluate properties of the release coating by the methods as described before. The results obtained are shown in Table 2.

TABLE 1

| | Proportions of materials (parts) | | | | | | | Characteristics of gum | |
|---|---|---|---|---|---|---|---|---|---|
| Gum | $D_4$ | $D_4^v$ | $M^vD_2M^v$ | $MD_2M$ | $H_3BO_3$ | $B_2O_3$ | Activated clay | Average composition formula | Boron content ppm |
| G-2 | 98.2 | 1.69 | 0.09 | — | 0.10 | — | 1.0 | $M^vD_{73}^vD_{4925}M^v.(BO_{1.5})_{6.0}$ | 176 |
| G-3 | 98.2 | 1.69 | 0.09 | — | 0.12 | — | 1.0 | $M^vD_{73}^v{4925}M^v.(BO_{1.5})_{7.1}$ | 207 |
| G-4 | 98.6 | 1.28 | — | 0.14 | 0.24 | — | 1.0 | $MD_{33}^vD_{2965}M.(BO_{1.5})_{8.5}$ | 413 |
| G-5 | 97.2 | 2.72 | 0.11 | — | — | 0.17 | 1.0 | $M^vD_{94}^vD_{3904}M^v.(BO_{1.5})_{14.6}$ | 530 |

TABLE 1-continued

| | Proportions of materials (parts) | | | | | | | Characteristics of gum | |
| --- | --- | --- | --- | --- | --- | --- | --- | --- | --- |
| Gum | $D_4$ | $D_4^v$ | $M'D_2M'$ | $MD_2M$ | $H_3BO_3$ | $B_2O_3$ | Activated clay | Average composition formula | Boron content ppm |
| G-6 | 98.2 | 1.69 | 0.09 | — | 0.0057 | — | 1.0 | $M'D_{73}'D_{4925}M'\cdot(BO_{1.5})_{0.34}$ | 10 |

TABLE 2

| | Examples | | | | | Comparative Example | | | |
| --- | --- | --- | --- | --- | --- | --- | --- | --- | --- |
| | 1 | 2 | 3 | 4 | 5 | 1 | 2 | 3 | 4 |
| Proportions of constituents (parts): | | | | | | | | | |
| Toluene | 583 | 583 | 583 | 583 | 583 | 583 | 583 | 583 | 583 |
| G-1 | 30 | | | | | | | | |
| G-2 | | 30 | | | | | | | |
| G-3 | | | 30 | | | | | | |
| G-4 | | | | 30 | | | | | |
| G-5 | | | | | 30 | | | | |
| G-6 | | | | | | 30 | | | |
| G-7 | | | | | | | 30 | 30 | |
| G-8 | | | | | | | | | 30 |
| H-1 | 0.75 | 0.75 | 0.75 | 0.55 | 1.20 | 0.75 | 0.75 | 0.75 | 0.75 |
| C-1 | 1.0 | 1.0 | 1.0 | 1.0 | 1.0 | 1.0 | 1.0 | 1.0 | 1.0 |
| P-1 | | | | | | | | 1.5 | |
| Peel force (gf/2.5 cm) Adhesive BPS8170 Peel rate | | | | | | | | | |
| 0.3 m/min. | 13 | 13 | 13 | 13 | 12 | 13 | 13 | 12 | 15 |
| 60 m/min. | 88 | 58 | 45 | 39 | 31 | 141 | 153 | 92 | 174 |
| 200 m/min. | 327 | 167 | 134 | 62 | 50 | 603 | 618 | 364 | 632 |
| BPS3110H Peel rate | | | | | | | | | |
| 0.3 m/min. | 9 | 9 | 9 | 9 | 8 | 9 | 9 | 9 | 10 |
| 60 m/min. | 142 | 103 | 97 | 60 | 51 | 198 | 207 | 168 | 224 |
| 200 m/min. | 373 | 121 | 106 | 95 | 89 | 648 | 662 | 400 | 677 |
| Subsequent Adhesion Rate (%) | 93 | 93 | 93 | 93 | 93 | 93 | 93 | 78 | 91 |

While the invention has been described in detail and with reference to specific embodiment thereof, it will be apparent to one skilled in the art that various changes and modifications can be made therein without departing from the spirit and scope thereof.

What is claimed is:

1. A composition for forming a release coating, comprising:
   (A) 100 parts by weight of a polyorganoborosiloxane having an average composition represented by formula I:

$$R_aSiO_{(4-a)/2}\cdot(BO_{1.5})_b \qquad (I)$$

wherein R is a substituted or unsubstituted monovalent hydrocarbon group bonded to a silicon atom, a is a number between 1.8 and 2.2, both inclusive, and b is a positive number, and containing at least 30 ppm by weight, based on the formula (I), of boron atoms in the form of $\equiv Si-O-B=$ linkages, each molecule thereof containing at least two alkenyl groups bonded to a silicon atom;
   (B) a polyorganohydrogensiloxane containing in each molecule at least three hydrogen atoms bonded to silicon atoms in an amount of 0.5 to 10 hydrogen atoms for each of said alkenyl groups in the component (A); and
   (C) a catalytic amount of a curing catalyst selected from the group consisting of platinum and platinum compounds.

2. A composition as claimed in claim 1, wherein said alkenyl groups are vinyl groups.

3. A composition as claimed in claim 1, wherein the hydrocarbon group other than alkenyl groups is a methyl group.

* * * * *